Patented Aug. 8, 1950

2,517,826

UNITED STATES PATENT OFFICE 2,517,826

BETA-(2-BENZOTHIENYL)-ALPHA-AMINO PROPIONIC ACID AND SALTS

Souren Avakian, Oreland, and Gustav J. Martin, Philadelphia, Pa., assignors to The National Drug Company, Philadelphia, Pa., a corporation of Pennsylvania No Drawing. Application March 25, 1948, Serial No. 17,115

2 Claims. (Cl. 260—329)

Our invention relates to new chemotherapeutic agents. More particularly, it concerns the novel compound beta-(2-benzothienyl)-alpha-aminopropionic acid and its salts, as well as a method for preparing the same. Our novel compound possesses the following structural formula:

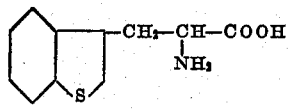

We have found that this amino acid and its salts possess outstanding anti-bacterial properties. They are highly effective displacing agents for the naturally occurring tryptophane which is one of the amino acids essential for bacterial growth. Our new amino acid possesses a structure similar to that of tryptophane, wherein a benzothienyl radical is substituted for the indyl radical. Owing to this relationship a very low concentration of our new chemotherapeutic agents will effectively inhibit bacterial growth, particularly of pathogenic bacteria.

Our new chemotherapeutic agents may be taken orally, injected intravenously, or incorporated in an ointment or powder and applied externally. A convenient form for topical application is an ointment containing about 5% of the novel amino acid. The salts may conveniently be formed from the amino acid by the addition of appropriate acids, particularly mineral acids such as hydrochloric acid. In turn such salts are converted back to the amino acid by neutralization, preferably with ammonium hydroxide. The amino acid is sparingly soluble in aqueous ethyl alcohol, whereas its salts are readily soluble therein. The amino acid is a white crystalline substance having a melting point of 279–280° C.

Our new chemotherapeutic agents may be prepared by first condensing 2-chloromethyl-benzothiophene with diethyl formylaminomalonate to form ethyl alpha-carbethoxy-alpha-formylamido - beta - (2 - benzothienyl) - propionate, and then heating said intermediate with a concentrated mineral acid to produce the corresponding salt of our novel amino acid. The latter can then be obtained by neutralizing the salt with an alkali such as ammonium hydroxide. The process may be illustrated graphically by the following chemical equations:

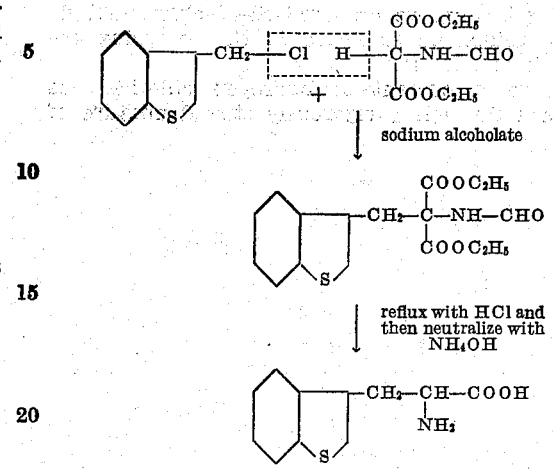

The preparation of our new compounds will be better understood upon consideration of the following specific example. Obviously our invention is not limited to the specific auxiliary reactants and reaction conditions set forth in this example, as such details may be varied without departing from the spirit of the invention.

*Example*

To a solution of 1.2 grams of sodium in 100 cc. of absolute alcohol there were added 10.2 grams of diethyl formylaminomalonate followed by 9.2 grams of 2-chloromethyl-benzothiophene. The mixture was then heated to reflux for a period of 3 hours, whereupon it was poured into ice water, and a precipitate recovered by filtration. In this manner there was obtained 29 grams of a crude product melting at 103–105° C. A sample of this product, recrystallized from petroleum ether, melted at 106–107° C. This intermediate is the ethyl alpha - carbethoxy - alpha - formylamido-beta-(2-benzothienyl)-propionate.

14 grams of the crude intermediate obtained as described above was heated to reflux with 200 cc. of concentrated hydrochloric acid over a period of 6 hours. The resultant solution was then evaporated to dryness under reduced pressure, and the residue obtained was dissolved in 75 cc. of 50% ethyl alcohol. Said solution was thereupon neutralized by the addition of ammonium hydroxide forming a precipitate consisting of 6.5 grams of the desired beta-(2-benzothienyl)-alpha-aminopropionic acid. This precipitate was washed with 50% ethyl alcohol and dried to give a crystalline product having a melting point of 279–280° C. A sulfur analysis of this product showed 14.08% of sulfur as against a theoretical content of 14.48%.

The 2-chloromethyl-benzothiophene employed as an initial material in the preparation of our new chemotherapeutic agents, is itself a novel compound. We have prepared it by reacting benzothiophene with formaldehyde and hydrogen chloride. The position of the chloromethyl thus introduced has been determined by reacting the resultant product with potassium cyanide and then saponifying the nitrile group so substituted for the chlorine of the chloromethyl group. The product thus obtained had the same melting point as the benzothiophene-2-acetic acid prepared from 2-bromo-benzothiophene according to the method disclosed by Crook and Davis in Journal of the Chemical Society, 1937, page 1697.

Specifically, we prepared the 2-chloromethyl-benzothiophene employed in the foregoing example as follows:

A rapid current of hydrogen chloride was passed through a vigorously stirred mixture of 20.1 grams (0.15 mole) of benzothiophene and 20 cc. of 40% formaldehyde, cooled in an ice bath. The reaction temperature was kept at 20–25° C. for 5 minutes and was then reduced to 10–15° C. After half an hour, the reaction mixture was diluted with ice water and extracted with ether. The ether layer was washed with an aqueous sodium bicarbonate solution, and then dried over sodium sulfate. Distillation of the ether extract gave 15.5 grams (56.3% yield) of a product boiling at 129–131° C. under a reduced pressure of 5.0 mm. Hg. Crystallization of this product from petroleum ether resulted in a white crystalline material that melted at 44–45° C. This was the 2-chloromethyl-benzothiophene whose identity was established as indicated above.

We claim:

1. A compound selected from the group consisting of beta-(2-benzothienyl)-alpha-amino propionic acid and its salts.

2. Beta-(2-benzothienyl)-alpha-amino propionic acid.

SOUREN AVAKIAN.
GUSTAV J. MARTIN.

REFERENCES CITED

The following references are of record in the file of this patent:

Albertson, J. Am. Chem. Soc., 67, 308–12 (1945).